United States Patent Office 3,223,615
Patented Dec. 14, 1965

3,223,615
OXIDATIVE PURIFICATION OF n-PARAFFINS
Philip S. Magee, San Rafael, Calif., assignor to Chevron Research Company, a corporation of Delaware
No Drawing. Filed July 20, 1962, Ser. No. 211,420
2 Claims. (Cl. 208—27)

This invention concerns a method of purification of paraffins to be used in free-radical oxidation.

Paraffins obtained from crude petroleum stocks find frequent use as precursors to alcohols. One method of oxidizing paraffins is a free-radical oxidation using oxygen in the presence of boric oxide. The free-radical nature of the oxidation makes the process extremely sensitive to trace impurities. The presence of impurities which inhibit the free-radical process frequently results in long induction periods and low yields. Paraffins having at least 8 carbon atoms obtained by the distillation of crude oil and then further treated to obtain predominantly n-paraffins were found to be inhibited during air oxidation in the presence of boric oxide. The inhibition was indicated by both an extended induction period and low oxygen uptake.

It was suprising to find that inhibition could be significantly reduced, if not completely removed, by treating the paraffin with oxygen at a temperature in excess of 400° F. to at least 1% conversion. That is only 1% by weight of the hydrocarbon had been converted to an oxygenated product. The mixture was then steam stripped until not less than 5% by weight of the hydrocarbon remained as a residue. The water was removed and the hydrocarbon dried. The resulting paraffins were shown to be as active in the air oxidation in the presence of boric oxide as a pure sample of n-dodecane.

The paraffins are obtained from petroleum. A desired cut may be obtained by distillation or other methods. The cuts used in this invention are hydrocarbons of at least 8 carbon atoms and preferably of at least 10 carbon atoms, but not more than 18 carbon atoms. The desired fraction may be treated in a variety of ways to obtain a predominant amount of n-paraffins. Such methods as urea adduction, molecular sieves, etc., are illustrative. The oxidative purification is carried out at a temperature of at least 400° F. and preferably in the range of 420° F. to 460° F. Autogenous pressure is satisfactory, although the purification may be carried out at higher or lower pressures, if desired.

While pure oxygen may be used in the purification, it is preferred to use an oxygen streams containing up to 20% oxygen by volume and preferably in the range of 1 to 10% oxygen by volume. The oxygen may be diluted with any inert gas, such as nitrogen, helium, argon, etc. The oxidative purification should be carried out to at least 1% conversion, but not more than 4% conversion and preferably not more than 2% conversion. That is, at least 1% by weight of the paraffin is converted to such oxygenated products as alcohols, ketones, hydroperoxides, etc.

The steam stripping may be carried out until at least 75% of the paraffin has been carried over. To minimize losses, it is preferred that at least 85% of the paraffin is carried over and preferably 95%.

The process of this invention can be further illustrated by reference to the following examples:

*Example I*

A sample of impure hydrocarbons having carbon contents predominantly in the range of $C_{11}$–$C_{15}$ and an average molecular weight of approximately 186 was heated in a reactor to 420° F. and a nitrogen stream containing 4% oxygen passed through the mixture at a rate of 179 liters per hour per kilogram of paraffin for one hour to provide a 2% conversion. The mixture was then steam stripped until 80% of the paraffin had been carried over. The hydrocarbon was then separated from the water and dried over calcium chloride.

To 275 ml. of the above-purified paraffin was added 8.3 g. of boric oxide. A nitrogen stream containing 4% oxygen was passed through the mixture at a rate of 179 liters per hour per kilogram while maintaining the temperature at about 382° F. After approximately 8 minutes, the reaction started absorbing oxygen until 88.5% of the oxygen introduced had been absorbed in a period of 2 hours and 30 minutes.

By comparison, the same paraffin under the same conditions without prior purification had an induction period of 18 minutes and absorbed only 21.5% of the oxygen passed through the mixture in approximately the same period of time.

*Example II*

To 300 ml. of pure n-dodecane was added 9.1 g. of boric oxide. The mixture was heated to 385° F. and nitrogen containing 4% oxygen was passed through the mixture at a rate of 164 liters per hour per kilogram of dodecane. After approximately 2½ minutes the reaction started to absorb oxygen and in a period of 2 hours had absorbed 89.7% of the oxygen passed through the reaction mixture.

As will be evident to those skilled in the art, various modifications on this process can be made or followed, in the light of the foregoing disclosure and discussion, without departing from the spirit or scope of the disclosure or from the scope of the following claims.

I claim:

1. A method of purifying paraffins of at least 8 carbon atoms derived from crude petroleum stock to be free-radically oxidized in the presence of boric oxide, which comprises heating said paraffins at a temperature in the range of 400° F. to 460° F. in the presence of oxygen for a time sufficient to result in from 1 to 4% conversion of said paraffins, steam stripping the resulting product to carry over the paraffins and isolating the purified paraffins.

2. A method according to claim 1, wherein the conversion is of not more than 2% and the oxygen stream contains not more than 10% oxygen by volume.

References Cited by the Examiner
UNITED STATES PATENTS

| | | | |
|---|---|---|---|
| 1,947,989 | 2/1934 | Hellthaler et al. | 260—451 |
| 2,661,362 | 12/1953 | Wadley et al. | 260—452 |

DELBERT E. GANTZ, *Primary Examiner.*

PAUL M. COUGHLAN, *Examiner.*